Dec. 11, 1962 J. GOGAN 3,067,800
TORSION BAR PRESETTING MACHINE
Filed March 15, 1960 7 Sheets-Sheet 1

INVENTOR.
JOSEPH GOGAN
BY Hudson Boughton
Williams, David & Hoffmann
ATTORNEYS

Dec. 11, 1962

J. GOGAN 3,067,800

TORSION BAR PRESETTING MACHINE

Filed March 15, 1960

INVENTOR.
JOSEPH GOGAN
BY Hudson, Boughton,
Williams, David & Hoffmann
ATTORNEYS Dec. 11, 1962  J. GOGAN  3,067,800
TORSION BAR PRESETTING MACHINE
Filed March 15, 1960  7 Sheets-Sheet 3

INVENTOR.
JOSEPH GOGAN
BY Hudson, Boughton,
Williams, David & Hoffmann
ATTORNEYS Dec. 11, 1962 J. GOGAN 3,067,800
TORSION BAR PRESETTING MACHINE
Filed March 15, 1960 7 Sheets-Sheet 4

INVENTOR.
JOSEPH GOGAN
BY Hudson, Boughton,
Williams, David & Hoffman
ATTORNEYS

Dec. 11, 1962 J. GOGAN 3,067,800
TORSION BAR PRESETTING MACHINE
Filed March 15, 1960 7 Sheets-Sheet 5
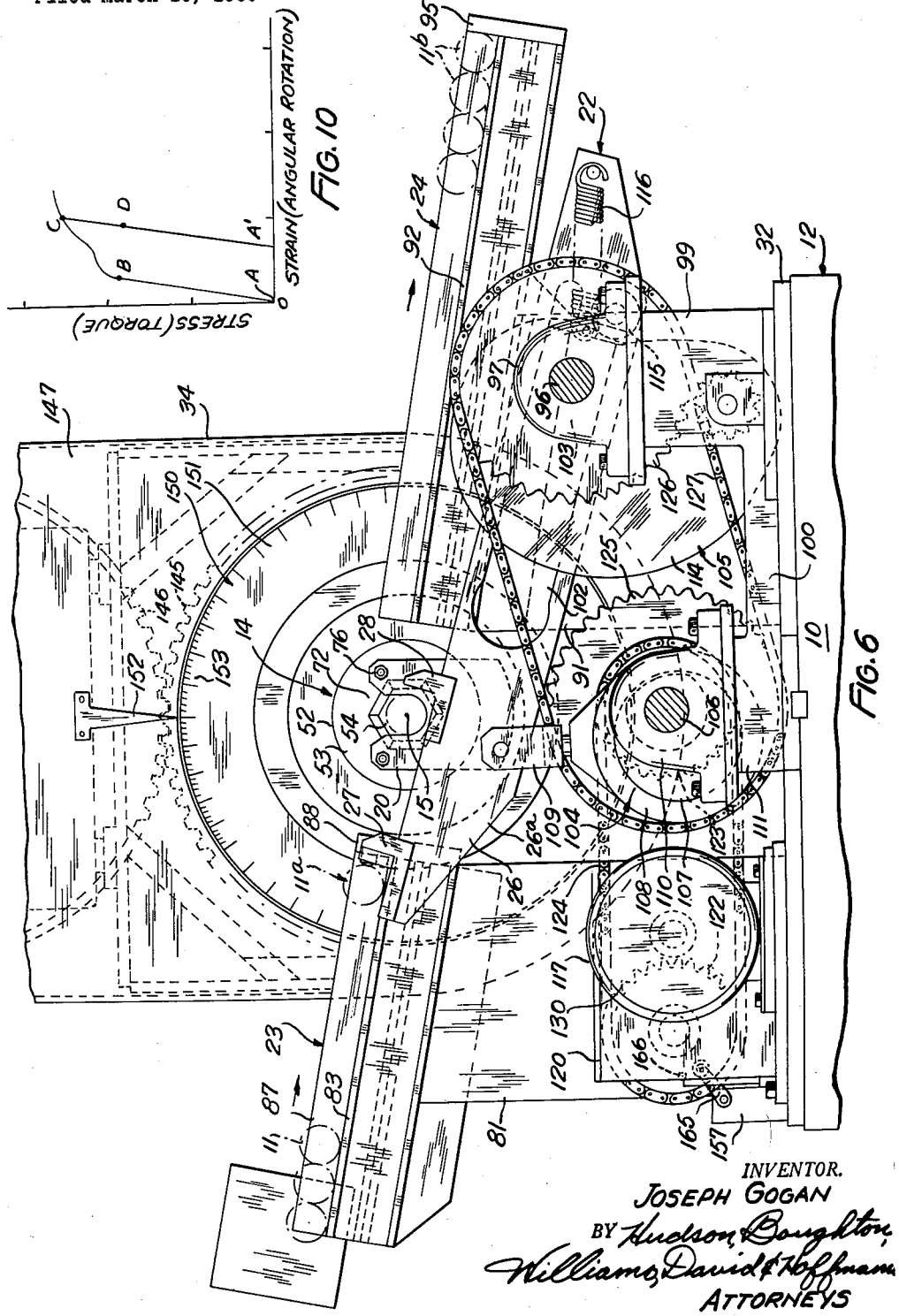
INVENTOR.
JOSEPH GOGAN
BY Hudson, Boughton,
Williams, David & Hoffman
ATTORNEYS

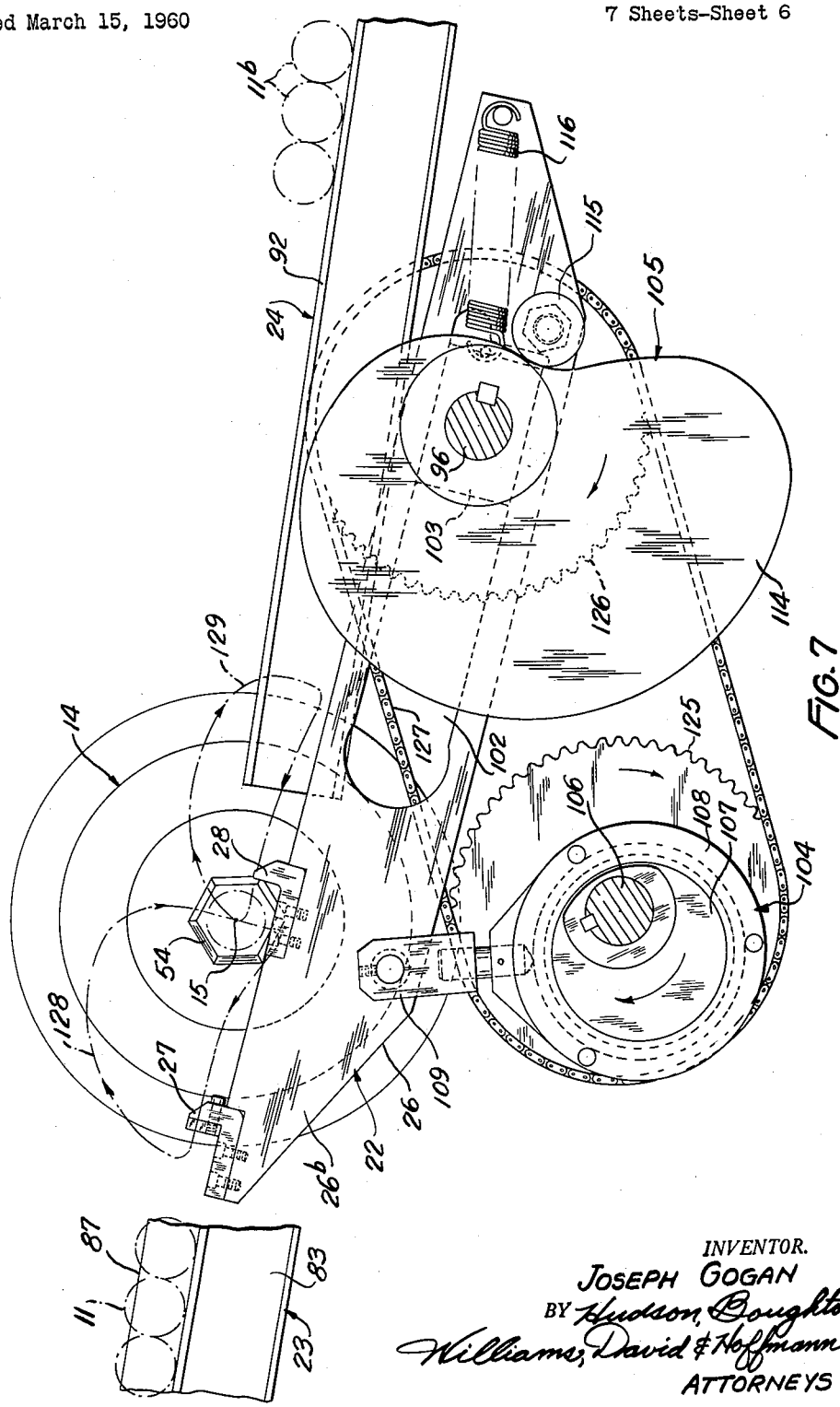

INVENTOR.
JOSEPH GOGAN
BY Hudson, Coughton,
Williams, David & Hoffmann
ATTORNEYS United States Patent Office
3,067,800
Patented Dec. 11, 1962

3,067,800
TORSION BAR PRESETTING MACHINE
Joseph Gogan, Wisner Road, R.R. 2, Willoughby, Ohio
Filed Mar. 15, 1960, Ser. No. 15,150
30 Claims. (Cl. 153—78)

This invention relates to machines for producing torsional deflection and permanent set in workpieces and, as one of its objects, aims to provide a novel machine by which such a torsional presetting of workpieces can be accomplished in a rapid and satisfactory manner and with a desired control for a sequential operation of the machine components, as well as a desired control for the extent of torsional deflection produced in the workpiece.

Although this novel machine can be used for torsionally deflecting or presetting various different kinds of workpieces, it is very useful for presetting torsion bars intended to be used in vehicles for load suspension purposes. Such presetting of torsion bars for vehicle use has been found to be desirable and beneficial as providing for a longer fatigue life of the bars and a higher value for the yield point of the preset bars.

Another object is to provide a novel machine for the purpose mentioned having relatively rotatable work-engaging chucks and other workholder means associated with the chucks for supporting and locating an individual workpiece relative thereto.

A further object is to provide a novel machine of the kind referred to above and having loading mechanism associated with the chucks for loading and unloading the workpieces.

Still another object is to provide a novel machine of the character indicated above comprising sequentially operable components and also having control means for controlling the operation of the components so as to achieve a desired sequential functioning thereof for carrying out a rapid and automatic processing of the workpieces.

Other objects and advantages of this invention will be apparent in the following detailed description and in the accompanying drawings forming a part of this specification and in which, FIG. 1 is a perspective top and front side view of machine embodying the present invention;

FIG. 6 is a partial transverse vertical section taken through the machine at a location to show the loading mechanism to best advantage, the view being taken approximately as indicated by section line 6—6 of FIG. 2;

FIG. 7 is a view showing actuating devices of the loading mechanism, the view being similar to that of FIG. 6 but with various portions of the loading mechanism and machine structure omitted;

FIG. 10 is a stress-strain diagram illustrating the torsional deflection produced in a workpiece in relation to the torque load applied thereto.

Figure 1:
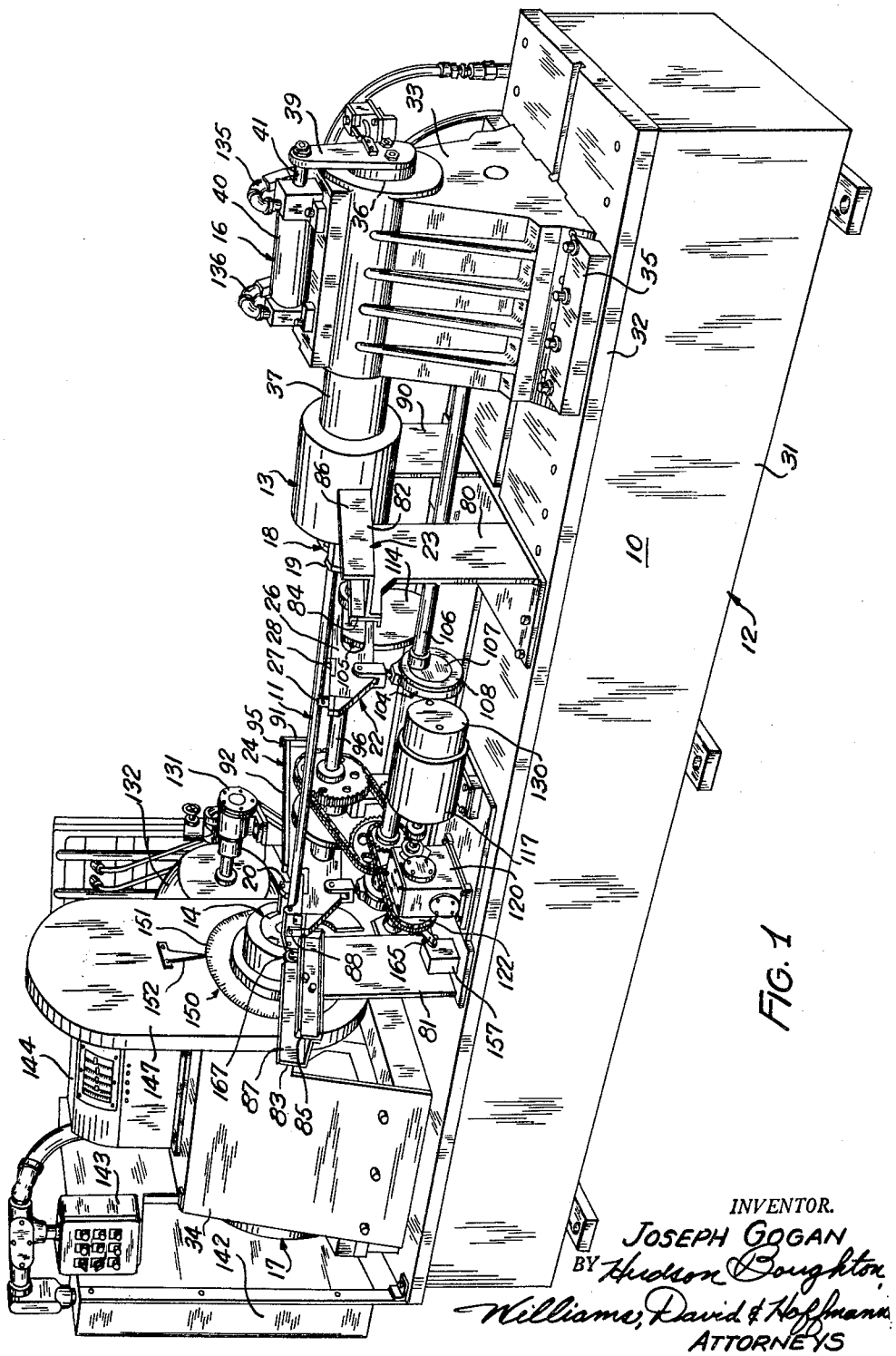
Figure 2:
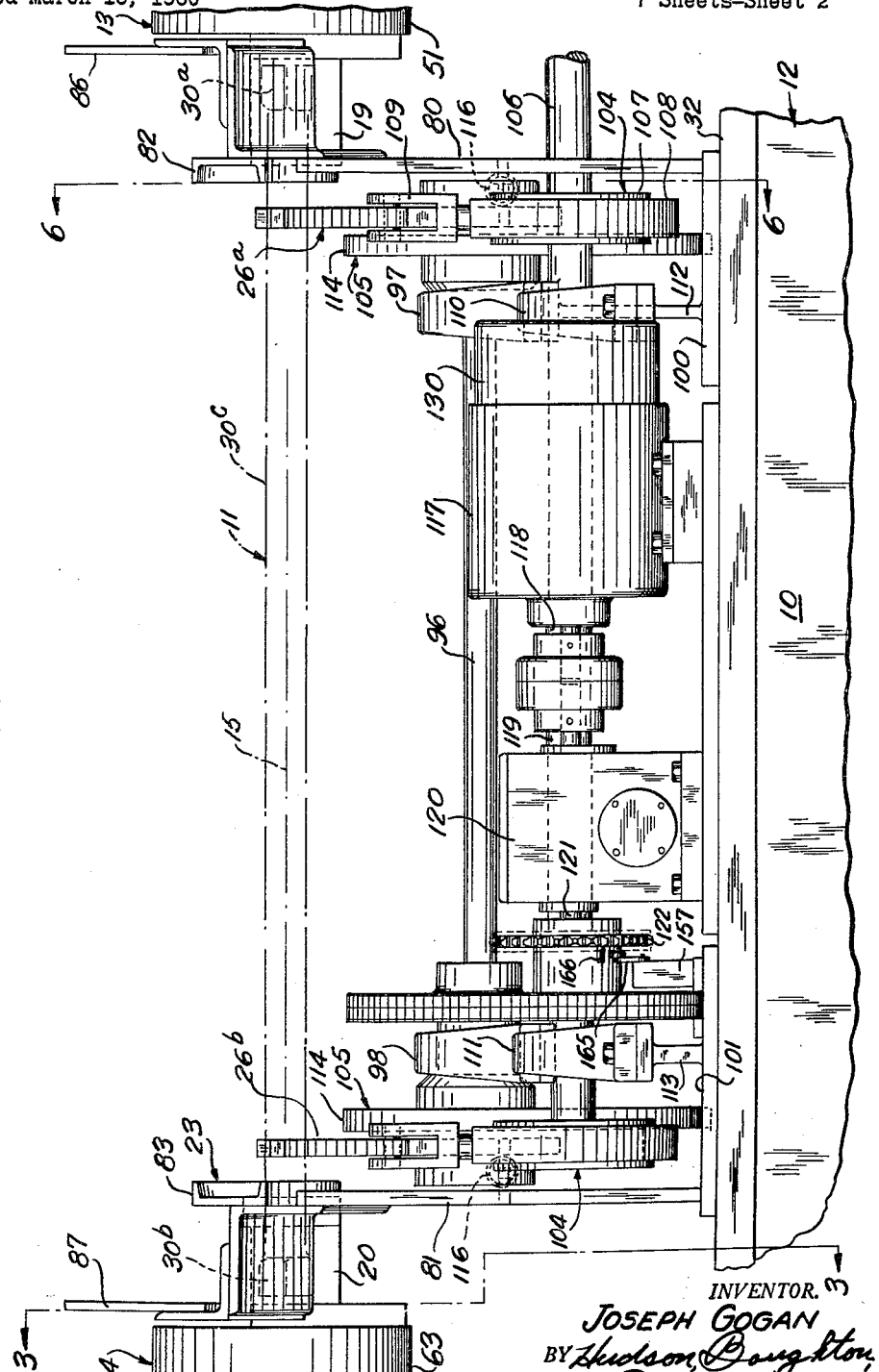
FIG. 2 is a partial side elevation of the machine from the front side thereof showing the axially spaced chucks and the loading mechanism associated therewith.

As a preferred embodiment of this invention the drawings show a machine 10 for torsionally deflecting or presetting a workpiece 11 and which machine comprises, in general, a support structure or frame 12 supporting a pair of tail and head chucks 13 and 14 in a spaced-apart relation on a common axis 15 and engageable with the ends of the workpiece. The chucks 13 and 14 have relative axial closing and opening movements for engaging and disengaging the workpiece 11, in this case by axial closing and opening movements of the tail chuck 13 relative to the head chuck 14 and produced by a first power device 16. The chucks 13 and 14 are also relatively rotatable on the common axis 15 for torsionally flexing or presetting the workpiece 11, in this case by a rotation of the head chuck 14 produced by a second power device 17 while the tail chuck 13 is restrained against rotation.

The machine 10 also includes an auxiliary workholder means 18 associated with the chucks and comprising auxiliary work support members 19 and 20 adjacent the respective chucks 13 and 14. As will be further explained hereinafter, the auxiliary work supports 19 and 20 support a new one of the workpieces 11 with the opposite ends thereof substantially aligned with the chucks 13 and 14 for engagement by the latter. The auxiliary work supports 19 and 20 also temporarily support a finished workpiece upon release from the chucks 13 and 14. The machine 10 further includes a loading mechanism 22 adjacent the chucks for supplying the individual workpieces 11 to the auxiliary workholder means 18 and removing the finished workpieces therefrom.

The loading mechanism 22 will be further described hereinafter but, at this point, it should be briefly explained that the loading mechanism comprises a supply means 23 located on one side of the common rotation axis 15 and adapted to provide a supply of the workpieces 11, and receiver means 24 located on the other side of the common axis and adapted to receive the finished workpieces. The loading mechanism 22 also comprises arm means 26 operable with a combined swinging and translatory movement in a plane extending transverse to the common axis 15 for transferring new workpieces from the supply means 23 to the auxiliary workholder means 18, and finished workpieces from the auxiliary workholder means to the receiver means 24. The arm means 26 is provided with picker means for engaging the workpieces, in this case, a first picker means 27 for picking a workpiece from the supply means 23 and a second picker means 28 for picking the finished workpiece from the auxiliary workholder means 18.

Before proceeding further with the description of the machine 10, the character of the operation performed thereby on the workpiece 11 should be briefly described. This can be best done by referring to the stress-strain diagram of FIG. 10. This diagram illustrates the torsional deflection or strain produced in the workpiece 11 by the torque or stress applied to the workpiece by the relative rotation between the chucks 13 and 14.

It is recognized by persons skilled in the art that when a torsion bar such as the workpiece 11 is intended for use for vehicle load suspension purposes, it will serve to better advantage if the bar has been preset by a stressing thereof to a predetermined extent beyond its elastic limit. This is the presetting operation performed by the machine 10 and, in the graph of FIG. 10, the curve ABC represents the torsional deflection to which the workpiece 11 is subjected by a predetermined torque load applied thereto. When the deflection of the workpiece is only of the extent represented by the straight-line portion AB of the curve, the flexure of the bar is still entirely within the elastic range thereof and, upon removal of the deflecting force, the bar will return exactly to its normal state.

However, when the workpiece 11 is subjected to a further torsional flexing represented by the portion BC of the curve, the workpiece is stressed beyond its elastic limit so that, upon removal of the torque load, the return angular movement of the bar to its unloaded condition is represented by the line CDA'. The increased length of the line CA' as compared with the line AB represents the changed condition and functional characteristic of the preset workpiece by which the yield point of the workpiece has now been extended to a much higher load value and the fatigue life of the workpiece has also been lengthened to a considerable extent. The workpiece 11, when thus treated or preset by a torsional flexing thereof, will serve to much better advantage for load supporting purposes in vehicle suspensions and the like.

Figure 9:
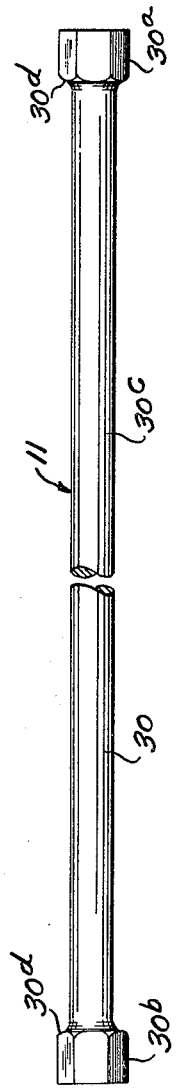
FIG. 9 is a side elevation showing the workpiece in a detached relation.

As shown in FIG. 9, the workpiece 11 may comprise an elongated rod-like body or bar 30 having enlargements or heads 30ª and 30ᵇ of noncircular shape, in this case of a hexagonal form, on the opposite ends thereof and by which the ends of the workpiece can be nonrotatably connected with the members to which such ends are to be attached. Since the heads 30ª and 30ᵇ are of a larger transverse dimension than the intermediate shaft portion 30ᶜ, they also provide shoulders 30ᵈ on the workpiece 11 adjacent the ends thereof and to which further reference will be made hereinafter.

Reverting now to the structure of the machine 10, it will be observed from the drawings that the frame 12 may comprise a laterally elongated base 31 having a top wall or plate 32 on which various components of the machine are mounted. The frame 12 also comprises a support member or pedestal 33 for supporting the tail chuck 13 and restraining the same from rotation, and a head portion or support member 34 containing shaft means for rotatably supporting the head chuck 14. The tail chuck support 33 is adjustably movable on the base 31 by being slidable on the plate 32 between a pair of gibs or the like 35 secured to the latter and by which this support can be clamped in the position of axial adjustment desired for the tail chuck.

To provide for the axial closing and opening movements of the tail chuck 13 the support 33 is provided with an axial guideway, in this case a cylindrical guideway 36, in which a chuck supporting stem 37 is slidable and is restrained against rotation by suitable key means (not shown). The opening and closing axial movements supplied by the power device 16 are transmitted to the rear end of the nonrotatable stem 37 by an actuating arm 39. The power device 16 is here shown as comprising a double-acting hydraulic fluid cylinder 40 mounted on the support 33 and having a reciprocable piston connected with the arm 39 by a piston rod 41.

The head portion 34 of the frame 12 provides an enclosure in which the power device 17 of the head chuck 14 is located. The power device 17 is here shown as being a double-acting hydraulic fluid device of the rotary type (see FIG. 8) having a housing 45 containing an arcuate cylinder chamber 46 in which a vane or the like 47 is oscillatable relative to a fixed abutment 48. A rotatable power output shaft 49 is connected with the vane 47 and projects from the housing 45 on the common axis 15 of the tail and head chucks 13 and 14. The outer end of the shaft 49 is connected with the head chuck 14 and supports the same for rotation thereof on the common axis.

The tail chuck 13 comprises a hollow chuck member 51 secured on the support stem 37 and containing a die means 52 for co-operation with the end or head 30ª of the workpiece 11. The die means 52 is here shown as comprising a socket-like die member 53 having a noncircular recess or socket 54 for receiving the noncircular end 30ª of the workpiece and by which such end is connected with the tail chuck 13 in a nonrotatable relation.

The die member 53 is nonrotatably connected with the hollow chuck member 51, as by means of a suitable key 55, and its inner end seats against a transverse connecting plate or disk 56 which is attached to the end of the support stem 37 by suitable screws 58. The die means 52 preferably also includes an end stop 59 which is located adjacent the inner end of the socket 54 and mounted on the connecting plate 56 by means of a suitable screw 60. A retaining ring 61 disposed between the connecting plate 56 and the end face of the support stem 27 has its peripheral edge engaged in an internal groove of the chuck member 51.

The head chuck 14 comprises a pair of axially adjacent hollow chuck members 62 and 63 both of which are mounted on the power output shaft 49 of the power device 17. The shaft 49 is provided with axially adjacent portions 64 and 65 on which the chuck members 62 and 63 are supported respectively as driving and driven chuck members. The chuck member 62 is connected with the shaft portion 64 in a fixed relation thereto, as by suitable keys 66, so that this chuck member serves as a driving chuck member for the driven chuck member 63. The shaft portion 65 is of a relatively reduced size and supports antifriction bearings 67 on which the driven chuck member 63 is rotatably supported.

The driving and driven chuck members 62 and 63 are provided at their adjacent ends with co-operating jaw portions 68 and 69 in an interfitting relation so that torque will be transmitted from the driving chuck member 62 to the driven chuck member 63. For a purpose to be explained hereinafter, the cooperating chuck portions 68 and 69 have radial clearance spaces 70 therebetween providing for a limited relative rotation between these chuck members and which limited rotation can be on the order of 15 degrees.

The driven member 63 of the head chuck 14 is a hollow member which is similar to the chuck member 51 of the tail chuck 13 and also contains die means 52 for co-operation with the end portion or head 30ᵇ of the workpiece 11 for establishing a torque-applying connection between the head chuck and the workpiece. The die means 52 of the chuck member 63 is similar to the die means of the tail chuck 13 and the same reference numerals have been applied to the same corresponding parts. In the case of the die means 52 of the chuck member 63, however, the end stop 59 is attached directly to the shaft portion 65 by the connecting screw 60.

As shown in the drawings, the auxiliary workholder means 18 is disposed between the chuck members 13 and 14 and is located on the common rotation axis 15. The auxiliary work support members 19 and 20 thereof are fork-shaped members having slots 71 and 72 extending thereinto from the top thereof for receiving the shaft portion 30ᶜ of the workpiece 11. For a purpose to be presently explained, the slots 71 and 72 are of a smaller transverse width than the heads 30ª and 30ᵇ of the workpiece 11 so as to act as stripper members when they are engaged by the shoulders 30ᵈ formed by such heads.

The auxiliary support members 19 and 20 include bottom and end plate members 74 and 75 by which the auxiliary support members are connected with their associated chucks 13 and 14 and are located in an adjacently spaced relation to the die members 53 of the chucks. The auxiliary support members 19 and 20 are connected with their respective chucks 13 and 14 by suitable connecting screws 76 extending through the end plate members 75 and into the hollow chuck members 51 and 63. Suitable guide members in the form of filler blocks 77 are secured to the bottom plates 74 by attaching screws 78 and facilitate the entry of the ends 30ª and 30ᵇ of the workpiece 11 into the die members 53 of the chucks. The auxiliary support member 19 being connected with the nonrotatable chuck member 13 is held against rotation by the latter, but the auxiliary support member 20 being connected with the rotatable chuck member 63 is rotatable with the latter about the common axis 15.

During the axial opening movement of the tail chuck 13, one of the heads of the workpiece 11 will necessarily be withdrawn from its associated die socket 54 and the shoulder 30$^d$ thereof will come into engagement with the associated auxiliary work support member. Thus, assuming that the head 30$^b$ of the workpiece 11 tends to stick in the die socket 54 of the chuck number 63, the head 30 will be withdrawn from the die socket of the tail chuck 13 and will come into engagement with the auxiliary support member 19 which will then act as a stripper member for pulling the head 30$^b$ out of the head chuck 14. When the tail chuck 13 has been shifted axially to the full extent of its opening movement, the heads 30$^a$ and 30$^b$ of the workpiece 11 will have been retracted from the sockets 54 and will lie outside of such sockets so that the finished workpiece can be lifted out of the slots of the auxiliary support members 19 and 20 either manually, or by the loading mechanism 22 as will be further explained hereinafter.

The supply means 23 of the loading mechanism 22 can be of any appropriate construction and, as here shown, comprises a pair of axially spaced upright brackets 80 and 81 mounted on the top plate 32 of the base 31 and having track members 82 and 83 at the top thereof which extend in a downwardly and inwardly sloping direction relative to the common axis 15. The track members 82 and 83 have rail portions 84 and 85 for receiving the shaft portions 30$^c$ of workpieces 11 in a rollable relation thereon. The track members 82 and 83 also have upright end walls 86 and 87 which are engageable as guide members by the opposite ends of the workpieces for confining the workpieces in an endwise direction of the machine 10.

Figure 8:
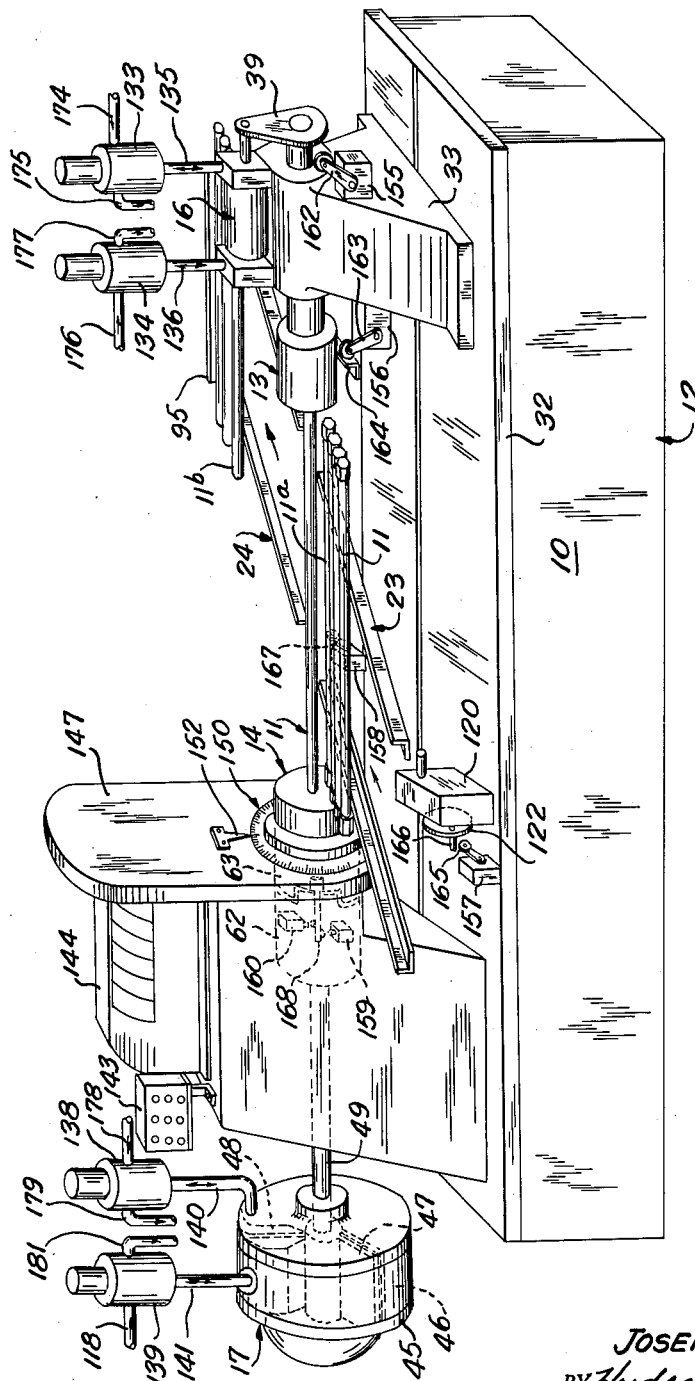
FIG. 8 is a perspective view of a diagrammatic form showing various control devices of the machine.

When a supply of workpieces 11 are placed on the supply means 23, they lie in a row as shown in FIG. 8 so that the lowermost workpiece 11$^a$ is always in a position ready to be engaged by the picker means 27. Additional workpieces 11 applied ot the supply means 23 will always tend to travel toward the position of the lowermost workpiece. The rail members 84 and 85 are provided at the lower ends thereof with suitable stop members 88 which are engageable by the lowermost workpiece 11$^a$.

The receiver means 24 can be of any suitable construction and is generally similar to the supply means 23 in that it comprises a pair of axially spaced upright brackets 90 and 91 mounted on the top plate 32 and having rail members 92 at the top thereof for receiving finished workpieces 11$^b$ thereon. The rail members 92 slope downwardly and outwardly away from the common axis 15 so that the finished workpieces 11$^b$, when deposited on the inner end portions of these rail members, will roll therealong and will accumulate at the outer or lower ends as shown in FIG. 6. Suitable stop means 95 is provided at the lower ends of the rail members 92 for retaining the finished workpieces 11$^b$ in a collected relation on the receiver means 24 until such workpieces can be removed therefrom.

The arm means 26 of the loading mechanism 22 can be of any suitable form for properly supporting and actuating the picker means comprising the spaced picker members 27 and 28. The arm means 26 is here shown as comprising a pair of axially spaced arm members 26$^a$ and 26$^b$ which are disposed in an edgewise-upright relation and extend in a lateral direction beneath, and transverse to, the common axis 15. The arm members 26$^a$ and 26$^b$ thus lie in two parallel upright planes which extend transverse to the common axis 15 at a substantially normal relation thereto.

The arm members 26$^a$ and 26$^b$ are supported on the frame 12 for vertical swinging and endwise translatory movements by pivot means which is here shown as comprising an axially extending shaft 96 rotatably mounted in axially spaced bearings 97 and 98. The bearings 97 and 98 are supported at an elevation above the top plate 32 of the frame 12 as by means of upright portions 99 of support brackets 100 and 101.

The arm members 26$^a$ and 26$^b$ are provided with slots 102 through which the shaft 96 extends so as to permit the endwise translatory movement of these arm members. The pivotal connections between the arm members 26$^a$ and 26$^b$ and the shaft 96 are formed by crosshead members or blocks 103 which are pivoted on this shaft and are slidably received in the slots 102. The slots 102 are of a suitable length to permit the extent of endwise translatory movement of the arm members 26$^a$ and 26$^b$ which is needed for the transfer operations performed by the picker members 27 and 28.

The swinging and translatory movements of the arm members 26$^a$ and 26$^b$ are produced by suitable actuating means, in this case, by two pairs of axially spaced actuating devices 104 and 105. The actuating devices 104 are here shown as being devices of the eccentric type located beneath the picker-carrying ends of the arm members 26$^a$ and 26$^b$ and driven by a rotatable shaft 106. Each of the devices 104 comprises an eccentric 107 secured on the shaft 106 and rotatable in an eccentric strap 108. The eccentric straps 108 are provided at the top thereof with yokes 109 by which they are attached to the arm members 26$^a$ and 26$^b$ for imparting lifting and lowering swinging movements to the latter. The shaft 106 is rotatably mounted in axially spaced bearings 110 and 111 which are supported somewhat above the plate 32 by the portions 112 and 113 of the brackets 100 and 101.

The actuating devices 105 each comprise a cam member 114 secured on the shaft 96 and co-operable with cam followers in the form of rollers 115 mounted on the arm members 26$^a$ and 26$^b$ adjacent the outer or lower ends thereof. The edges of the cam members 114 are of a suitable contour so that the co-operation of these cam members with the rollers 115 will impart the desired endwise translatory movement to the arm members 26$^a$ and 26$^b$ during the vertical swinging of the latter by the actuating devices 104. The rollers 115 of the arm members 26$^a$ and 26$^b$ are maintained in engagement with the cam members 114 by the action of tension springs 116 connected between the crosshead blocks 103 and the outer ends of the arm members.

A common driving means is provided for the pairs of actuating devices 104 and 105 and is here shown as comprising an electric motor 117 mounted on a base secured to the top plate 32 and having the shaft 118 thereof connected with the input shaft 119 of a gear box 120. The output shaft 121 of the gear box 120 carries a drive sprocket 122 which is connected with a sprocket 123 of the shaft 106 by a chain 124.

The shaft 96 of the power devices 105 is driven from the shaft 106 by means of sprockets 125 and 126 secured on these shafts and a chain 127 extending around such sprockets. The drive sprocket 122 of the gear box 120 and the driven sprocket 123 of the shaft 106 are of the same pitch diameter so as to provide a 1:1 drive ratio. Likewise, the sprockets 125 and 126 are of the same diameter so as to provide a 1:1 drive ratio between the shafts 106 and 96.

A pair of the picker members 27 and 28 is mounted in a longitudinally spaced relation on each of the arm members 26$^a$ and 26$^b$ and are so disposed, in relation to the adjacent ends of the supply means 23 and the receiver means 24, that when the arm members are actuated by the devices 104 and 105 the picker members 27 will pick the lowermost workpiece 11$^a$ from the supply means 23 and transfer the same to the auxiliary support members 19 and 20, and the picker members 28 will operate to pick a finished workpiece from the auxiliary support members and deposit the same on the receiver means 24. The movements of the picker members 27 and 28 in carrying out these functions are gyratory movements represented by the movement paths 128 and 129 of FIG. 7. The movement path 128 represents the path followed by each of the picker members 27 during one cycle of operation of the loading mechanism 22, and the movement path 129 represents the path followed by each of the picker members 28 during such single cycle of the loading mechanism.

In FIGS. 6 and 7 the loading mechanism 22 is shown in its initial or starting position at which time the picker members 27 are located immediately below the horizontal level of the delivery ends of the rail members 84 and 85, and the picker members 28 are then located immediately below the common axis 15 of the chuck members 13 and 14. From the contours of the path lines 128 and 129 of FIG. 7 it will be seen that, upon starting of the loading mechanism 22, the picker members 27 and 28 will be moved in an upward or lifting direction by an upward swinging imparted to the arm members 26ª and 26ᵇ by the eccentrics 107 of the actuating devices 104.

This upward swinging movement of the arm members 26ª and 26ᵇ will cause the picker members 28 to lift the finished workpiece out of the slots 71 and 72 of the auxiliary support members 19 and 20, and will also cause the picker members 27 to lift and disengage the lowermost new workpiece 11ª from the delivery end of the supply means 23. As the lifting movement of the picker members 27 and 28 continues, the cam members 114 of the actuating devices 105 exert a pushing force against the rollers 115 to thereby impart the endwise translatory movement to the arm members 26ª and 26ᵇ in a direction toward the right as is indicated by the upper portions of the path lines 128 and 129. This translatory movement of the arm members 26ª and 26ᵇ causes the picker members 28 to transfer the finished workpiece to a position above the receiver means 24, and also causes the picker members 27 to transfer the new workpiece 11ª to a position above the auxiliary support members 19 and 20.

A lowering or downward swinging movement of the arm members 26ª and 26ᵇ produced by the eccentrics 107 are represented by the right end portions of the path lines 128 and 129 deposits the finished workpiece on the receiver means 24 and also deposits the new workpiece 11ª in the auxiliary support members 19 and 20. The lowering movement of the arm members 26ª and 26ᵇ continues for a short interval following such deposit of the workpieces and is then automatically stopped by a brake device 130 connected with the electric motor 117, to leave the arm members and picker members temporarily at the initial or starting position.

While the loading mechanism 22 is at rest in its starting position, the tail chuck 13 is actuated to its closed position causing the die members 53 of the two chucks to engage and become connected with the head 30ª and 30ᵇ of the workpiece 11 which is then supported in an aligned relation to the chucks by the auxiliary support members 19 and 20. Following the closing of the tail chuck 13, the head chuck 14 is rotated to twist the workpiece 11 to the desired extent. Thereafter the head chuck 14 is rotated back to its initial position and the tail chuck is axially opened to leave the finished workpiece in an unloading position in which it is temporarily held by the auxiliary support members 19 and 20.

Pressure fluid for operating the power device 16 of the tail chuck 13 and the power device 17 of the head chuck 14 is supplied from a suitable source such as a pump 131 driven by an electric motor 132. The pressure fluid for the power device 16 is controlled by suitable valve means comprising a pair of solenoid valve devices 133 and 134 which are connected with the opposite ends of the cylinder 40 by in-and-out conduits 135 and 136. The pressure fluid for the power device 17 is likewise controlled by suitable valve means comprising solenoid valve devices 138 and 139 which are connected with the cylinder chamber 46 on opposite sides of the abutment 48 by in-and-out conduits 140 and 141.

Figure 4:
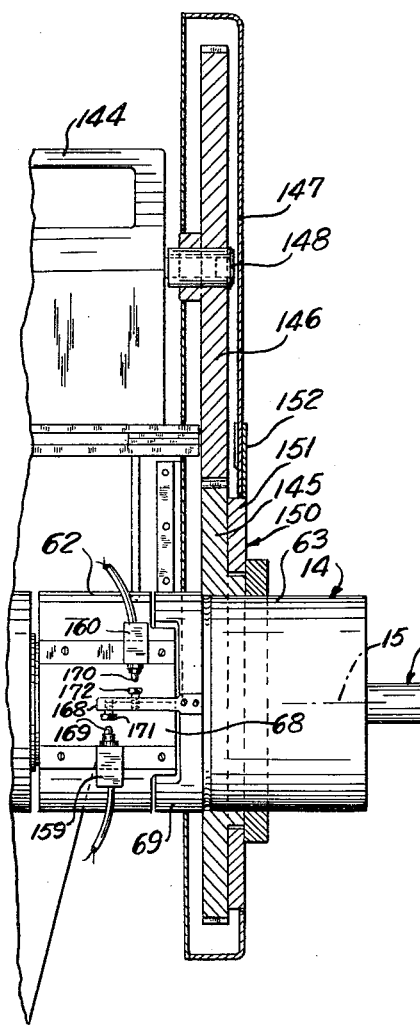
FIG. 4 is a partial vertical axial section taken through the head chuck portion of the machine as indicated by section line 4—4 of FIG. 3.
Figure 3:
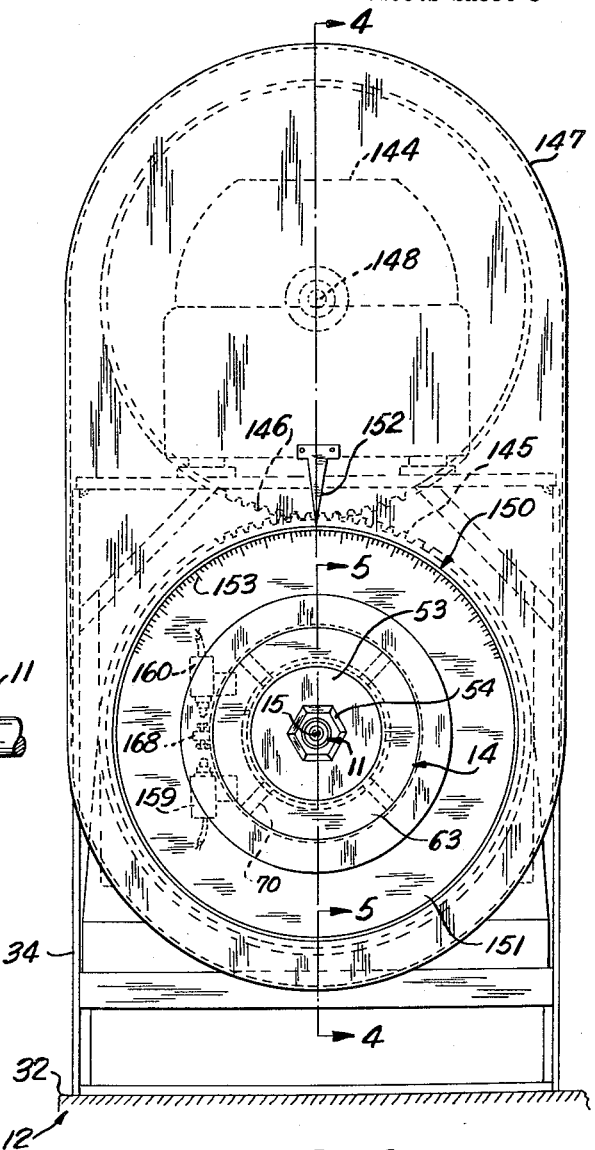
FIG. 3 is a partial transverse vertical section taken through the machine at the location indicated by section line 3—3 of FIG. 2 and looking toward the head chuck.
Figure 5:
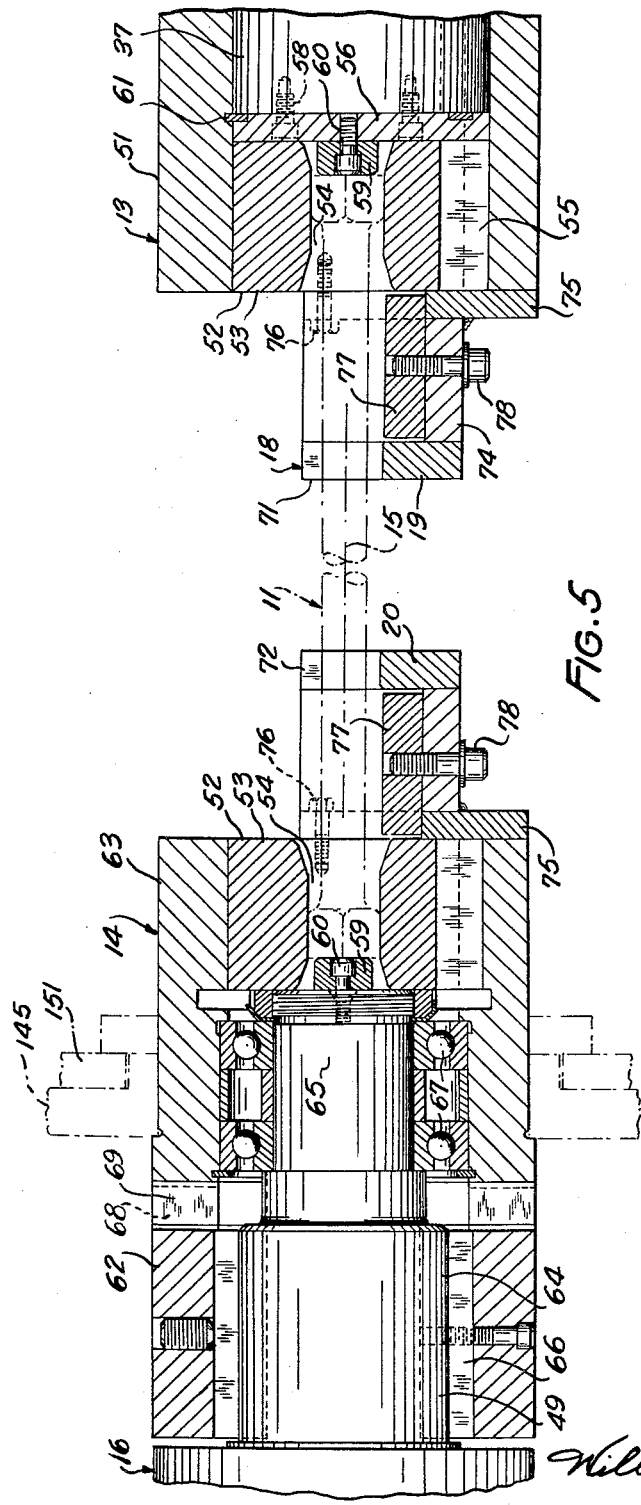
FIG. 5 is a partial vertical axial section taken through the chucks and the auxiliary workholders associated therewith, the view being taken substantially as indicated by section line 5—5 of FIG. 3.

The top plate 32 and the head portion 34 of the frame 12 also form a support means for certain electrical apparatus of the machine 10 comprising an electrical cabinet 142, a push-button switch device 143 and a cam switch device 144. The cam switch device 144 will be further described hereinafter but, at this point, only the driving connection for this switch device will be referred to. The driving means for the switch device 144 is a gear train (see FIGS. 3 and 4) comprising gear members 145 and 146 located in a gear housing 147. The gear housing 147 is suitably supported as by being connected with the support member 34 of the frame 12.

The gear member 145 is the driving gear of the train and is connected with the head chuck 14 for rotation therewith by being mounted on the driven chuck member 63 in a surrounding relation thereto. The gear member 146 is a driven gear member and is fixed on a projecting shaft 148 of the switch device 144. The gear members 145 and 146 are here shown as being of a 1:1 ratio so that the shaft 148 of the switch device 144 will be rotated at the same speed and through the same angular distances as the chuck member 63.

The machine 10 includes indicating means 150 for indicating the torsional deflection or amount of preset to which the workpiece 11 is subjected. The indicating means 150 is here shown as being of the visual type comprising co-operating movable and stationary indicator members 151 and 152. The stationary indicator member 152 is a pointer or the like mounted on the outer wall of the gear housing 147 and the movable indicator member 151 is here shown as being a flat ring carried by the chuck member 63 and extending therearound. The movable indicator member 151 carries a graduated scale 153 extending around the peripheral edge portion thereof so that the movement of this scale relative to the pointer 152 will indicate the angular extent to which the workpiece 11 has been twisted.

The operation of the machine 10 and the various components and mechanisms thereof is controlled by a plurality of switch devices in addition to the switch device 143 and 144 referred to above and which additional switch devices are shown in FIG. 8 and comprise limit switch devices 155, 156, 157, 158, 159 and 160.

The limit switch devices 155 and 156 are associated with the tail chuck 13 and are responsive to the axial closing and opening movements thereof. The limit switch device 155 is mounted on the outer side or remote end face of the tail chuck support 33 and includes a roller-carrying arm 162 which is engageable and swingable by the actuating arm 39 when the tail chuck 13 is actuated toward its closed position. The limit switch device 156 is mounted on the opposite or inner side of the tail chuck support 33 and includes a roller-carrying arm 163 which is engageable and swingable by a thrust member or clip 164 of the tail chuck 13 during opening axial movement of the latter.

The limit switch device 157 controls the cyclical operation of the loading mechanism 22 by automatically stopping this mechanism when the picker members 27 and 28 have been actuated through one complete cycle of gyratory movement and have been returned to their initial positions described above. The limit switch device 157 is mounted on the frame 12 adjacent the gear box 120 and includes a roller-carrying arm 165 which is engageable and swingable by an actuating pin 166 projecting from the drive sprocket 122.

The limit switch device 158 is suitably mounted on the supply means 23 of the loading mechanism 22 and is responsive to the presence or absence of workpieces 11 on the supply means. This limit switch device 158 includes a roller-carrying arm 167 which is located so as to be engageable and swingable by a workpiece moving into the position of the lowermost workpiece 11ª on the supply means 23.

The limit switch devices 159 and 160 are load indicating switch devices mounted on the head chuck 14 and which indicate whether or not the workpiece 11 is under torsional load. The limit switch device 159 is actuatable in response to a right-hand presetting operation of the head chuck 14 and the limit switch device 160 is actuatable in response to a left-hand presetting operation of the head chuck.

The limit switch devices 159 and 160 are here shown as being devices of the microswitch type and are mounted in a circumferentially spaced relation on the driving chuck member 62. A common actuating member 168 is provided for the switch devices 159 and 160 and is connected to the driven chuck member 63 so as to extend axially between the actuating stems 169 and 170 which project from the spaced switch devices. The actuating member 168 carries screws 171 and 172 as adjustable thrust members for actuating engagement with the switch stems 169 and 170.

When the driving chuck member 62 is rotated in a right-hand direction to preset the workpiece 11, the driven chuck member 63 will be initially held against rotation by the workpiece until the intervening space or gap 70 is taken up, whereupon the thrust screw 171 will engage and actuate the switch stem 169 of the switch device 159 to indicate that a torsional load has been applied to the workpiece. If the torsional load being applied to the workpiece 11 is in a left-hand direction, the thrust screw 172 will engage and actuate the stem 170 of the switch device 160.

Upon completion of the twisting operation, the head chuck 14 is rotated back toward its initial position until the thrust screw of the actuating member 168 releases or disengages the stem of whichever one of the switch devices 159 and 160 was just previously actuated during the twisting of the workpiece and which, for example, may have been the switch device 159. The release of the stem 169 by the thrust screw 171 will thus indicate the point of rotation of the head chuck 14 where the torsion load on the workpiece 11 has been fully removed. The rotation of the head chuck 14 is stopped at this point so that the operator of the machine can note the reading then appearing on the indicating device 150 for comparison with the initial reading as an indication of the preset of the workpiece 11.

The cam switch device 144 can be any suitable form of rotary timer switch device such as a suitable form of so-called cam limit switch. The limit switch device 144 here shown is a commercially available cam limit switch known as Clark Type AL Limit Switch shown in Bulletin 102 of The Clark Controller Company.

The various limit switches described above comprising the limit switch devices 155, 156, 157, 158, 159 and 160 are conventional in form and are electrically connected with the push-button switch device 143 and the cam switch device 144 as well as with the solenoid valve devices 133, 134, 138 and 139 by suitable circuitry which includes an appropriate source of energizing current. The circuitry for the switch devices above referred to also extends to the driving motor 117 of the loading mechanism 22 and to the main driving motor 132 of the pump 131, as well as to the brake device 130 associated with the electric motor 117. The circuitry for the various switch devices referred to above also extends to the electrical cabinet 142 in which suitable conventional line switches, fuses, relays, contactors and the like, are located.

The solenoid valve devices 133 and 134 controlling the tail chuck 13 are connected with the pump 131 by pairs of supply and return conduits 174, 175 and 176, 177. Similarly the solenoid valve devices 138 and 139 controlling the head chuck motor 17 are connected with the pump 131 by pairs of supply and return conduits 178, 179, and 180, 181.

The type of operation carried out by the machine 10 and the sequential character thereof have already been referred to above in a general way, but the full operation of the machine will now be described with reference to the various components thereof including the loading mechanism 22, the power devices 16 and 17, the control valve 133, 134 and 138, 139, and the various switch devices.

To place the machine 10 in readiness for operation, an appropriate push-button of the switch device 143 is actuated to start the main electric motor 132 so that a supply of hydraulic pressure fluid will be made available for the power devices 16 and 17. If one or more workpieces 11 are present on the supply means 23, the limit switch device 158 will be in an actuated condition by the lowermost workpiece 11a to further place the machine 10 in readiness for operation. By the actuation of another push button of the switch 143, the brake 130 associated with the motor 117 will be released and this motor will be energized to start the loading mechanism 22 whereby a workpiece will be transferred from the supply means 23 to the auxiliary support members 19 and 20. Upon the completion of one cycle of operation ending with the deposit of the transferred workpiece in the auxiliary support members 19 and 20, the limit switch device 157 will be actuated by the pin 166 of the sprocket 122 to automatically stop the loading mechanism.

This actuation of the limit switch device 157 also initiates the closing actuation of the tail chuck 13 by the power device 16 through a suitable energization of the solenoid valve devices 133 and 134. When the tail chuck 13 has been closed and the ends of the workpiece 11 have been engaged in the die members 53 of the head and tail chucks, the limit switch devices 155 will be actuated by the arm 39 to stop the closing movement of the tail chuck through further appropriate electrical control of the solenoid valve devices 133 and 134. This actuation of the limit switch device 155 is effective, through suitable circuitry connecting the same with the cam switch device 144, the limit switch devices 159 and 160, and the solenoid valve devices 138 and 139, to cause operation of the power device 17 to rotate the head chuck 14 and preset the workpiece 11.

When the presetting operation has been carried out to the extent for which the cam limit switch device 144 has been set, the power device 17 will be reversed through further electrical control of the solenoid valve devices 138 and 139 to remove the torque load from the workpiece 11, whereupon the unloaded condition of the workpiece will be signaled to the cam limit switch device by one or the other of the switch devices 159 and 160.

If the preset imparted to the workpiece 11 is a satisfactory amount, the cam limit switch device 144 will thereupon direct the succeeding operation of the machine 10 in a manner to unload the finished workpiece and reload with a new workpiece. On the other hand, if the amount of preset given to the workpiece is not an adequate amount, the cam limit switch device 144 will recognize this fact and will cause one or more repeat operations of the presetting portion of the operating cycle.

Assuming that the amount of preset given to the workpiece 11 is satisfactory, the cam limit switch device 144 will then be effective through the limit switch device 155 and the solenoid valve devices 133 and 134, to cause opening or retraction of the tail chuck 13 whereby the finished workpiece is disengaged from the chucks and left in a temporarily supported position on the auxiliary support members 19 and 20. Upon completion of the retracting movement of the tail chuck 13, the limit switch device 156 is actuated to cause the valve devices 133 and 134 to automatically stop the opening movement of the tail chuck. The actuation of the limit switch device 156 in stopping the opening movement of the tail chuck 13, is also effective to cause the release of the brake device 130 and a restarting of the motor 117 of the loading mechanism 22.

The loading mechanism 22 thereupon operates through its single cycle of operation previously described above by which the finished workpiece is transferred from the auxiliary support members 19 and 20 to the receiver means 24 and a new workpiece is transferred from the supply means 23 to the auxiliary support members for engagement by the chucks 14 and 13 during the next closing actuation of the latter chuck. The operating sequence described above will be repeated by the machine 10 as long as a supply of workpieces is made available on the supply means 23.

From the foregoing accompanying drawings and the foregoing detailed description it will now be readily understood that this invention provides a highly practical machine for carrying out a torsional flexing or presetting of rod-like workpieces such as torsion bars for vehicle suspension uses or other articles. It will now also be recognized that the novel machine provided by this invention comprises loading mechanism, head and tail chucks, and the other components described above, and will operate in a rapid and efficient manner to carry out a desired sequential performance which includes an automatic loading and unloading of the workpieces, as well as an automatic disengagement of the ends of the workpiece from the chucks upon the completion of the presetting operation.

Although the torsion bar presetting machine of this invention has been illustrated and described herein to a somewhat detailed extent, it will be understood, of course, that the invention is not to be regarded as being correspondingly limited in scope but includes all changes and modifications coming within the terms of the claims hereof.

Having described my invention, I claim:

1. In a machine for torsionally flexing a metal workpiece having shoulder means adjacent opposite ends thereof; a frame; chuck means comprising a pair of relatively rotatable chucks disposed in a spaced-apart relation on a common axis; support means on said frame supporting the chucks for the relative rotation and providing for axial closing and opening relative movements between said chucks; said chucks having workholder portions adapted to receive said ends for connecting the ends with the chucks; first actuating means connected with said chuck means for causing the axial closing and opening relative movements between the chucks; rotary actuating means connected with said chuck means for causing the relative rotation between the chucks; and auxiliary workholder members in axially adjacent relation to said chucks; the auxiliary member associated with one chuck being engageable by the shoulder means of one end of the workpiece, in response to axial opening relative movement between the chucks, for pulling the other end of the workpiece out of the other chuck.

2. In a machine for torsionally flexing a metal workpiece having shoulder means adjacent opposite ends thereof; a frame; a pair of head and tail chucks disposed in a spaced-apart relation on a common axis; support means on said frame supporting the tail chuck for axial closing and opening movements relative to the head chuck and restraining said tail chuck against rotation; said chucks having hollow workholder portions adapted for axial reception of said opposite ends therein for connecting said ends with the chucks; first actuating means on said frame and connected with said tail chuck for imparting said axial movements thereto; rotary actuating means on said frame and connected with said head chuck to rotate the same; and auxiliary workholder devices connected with said chucks and spaced from the workholder portions thereof; one of said auxiliary devices being engageable by the shoulder means of one end of the workpiece in response to axial opening movement of the tail chuck for pulling the other end of the workpiece out of its associated chuck.

3. In a machine for operating on a rod-like workpiece; a frame; chuck means comprising a pair of relatively rotatable chucks disposed in a spaced-apart relation on a common axis and having work-engageable die means therein; support means on said frame supporting the chucks for the relative rotation and providing for axial closing and opening relative movement between said chucks; a first actuating means connected with said chuck means and operable to cause the axial closing relative movement between the chucks for engaging the die means thereof with opposite ends of the workpiece; a rotary actuating means connected with said chuck means for causing the relative rotation between the chucks while said ends are in engagement with said die means; and auxiliary workholder means between said chucks for receiving and supporting the workpiece with the ends thereof in a substantially axially aligned relation to the chucks.

4. A machine as defined in claim 3 for operating on a rod-like workpiece having shoulder means adjacent opposite ends thereof wherein said auxiliary devices have openings of a smaller transverse dimension than said shoulder means; one of said auxiliary devices being engageable by the shoulder means of one end of the workpiece in response to opening axial movement between the chucks for disengaging the other end of the workpiece from the die means of the other chuck.

5. A machine as defined in claim 4 wherein said auxiliary devices comprise members having edge portions; and wherein said openings extend through said edge portions.

6. A machine as defined in claim 4 wherein said auxiliary devices comprise forked members and said openings are fork recesses extending into said members from the outer ends thereof.

7. In a machine for operating on rod-like workpieces; a frame; chuck means comprising a pair of relatively rotatable chucks disposed in a spaced-apart relation on a common axis and having work-engageable die means therein; support means on said frame supporting the chucks for the relative rotation and providing for axial closing and opening relative movement between said chucks; a first actuating means connected with said chuck means and operable to cause the axial closing relative movement between the chucks for engaging the die means thereof with opposite ends of a workpiece; a rotary actuating means connected with said chuck means for causing the relative rotation between the chucks while said ends are in engagement with said die means; loading means comprising swingable arm means adapted to receive the workpiece thereon; auxiliary workholder members adjacent said chucks for receiving the workpiece from said loading means and supporting the workpiece with the ends thereof in a substantially axially aligned relation to the chucks; means supporting said loading means for swinging of said arm means downwardly and transversely of said common axis for depositing the workpiece on said auxiliary members; and actuating means effective on said loading means including means for causing said swinging of said arm means.

8. In a machine for operating on rod-like workpieces; a frame; chuck means comprising a pair of relatively rotatable chucks disposed in a spaced-apart relation on a common axis and having work-engageable die means therein; support means on said frame supporting the chucks for the relative rotation and providing for axial closing and opening relative movement between said chucks; a first actuating means connected with said chuck means and operable to cause the axial closing relative movement between the chucks for engaging the die means thereof with opposite ends of a workpiece; a rotary actuating means connected with said chuck means for causing the relative rotation between the chucks while said ends are in engagement with said die means; loading means comprising arm means adapted to receive the workpiece thereon; means supporting said arm means for feeding movement in a plane extending transverse to said common axis and comprising a lifting movement component and a lowering movement component; actuating means effective on said arm means for causing said feeding movement thereof; and auxiliary work-holder means located relative to said chuck means to receive the workpiece from said arm means during the lowering movement component of said feeding movement and to support the workpiece with the ends thereof in a substantially axially aligned relation to the chucks.

9. In a machine for operating on rod-like workpieces; a frame; chuck means comprising a pair of relatively rotatable chucks disposed in a spaced-apart relation on a common axis and having work-engageable die means therein; support means on said frame supporting the chucks for the relative rotation and providing for axial closing and opening relative movement between said chucks; first actuating means connected with said chuck means and operable to cause the axial closing relative movement between the chucks for engaging the die means thereof with opposite ends of a workpiece; a rotary actuating means connected with said chuck means for causing the relative rotation between the chucks while said ends are in engagement with said die means; supply means on one side of said common axis and adapted to supply individual workpieces in succession; auxiliary workholder means adjacent said chucks for receiving a workpiece and supporting the same with the ends thereof in a substantially axially aligned relation to the chucks; loading means comprising a picker means; means supporting said loading means for feeding movement of said picker means in a plane extending transverse to said common axis and comprising a lifting movement component for picking a workpiece from said supply means and a lowering movement component for depositing the workpiece on said auxiliary means; and actuating means effective on said loading means to cause said feeding movement of the picker means.

10. In a machine for operating on rod-like workpieces; a frame; chuck means comprising a pair of relatively rotatable chucks disposed in a spaced-apart relation on a common axis and having work-engageable die means therein; support means on said frame supporting the chucks for the relative rotation and providing for axial closing and opening relative movement between said chucks; a first actuating means connected with said chuck means and operable to cause the axial closing relative movement between the chucks for engaging the die means thereof with opposite ends of a workpiece; a rotary actuating means connected with said chuck means for causing the relative rotation between the chucks while said ends are in engagement with said die means; auxiliary workholder means adjacent said chuck means for supporting a finished workpiece upon the occurrence of the opening relative movement between the chucks; receiver means on one side of said common axis for receiving finished workpieces; loading means comprising a picker means; means supporting said loading means for delivery movement of said picker means in a plane extending transverse to said common axis and comprising a lifting movement component for picking the finished workpiece from said auxiliary means and a lowering movement component for depositing the finished workpiece on said receiver means; and actuating means effective on said loading means to cause said delivery movement of the picker means.

11. In a machine for operating on rod-like workpieces; a frame; chuck means comprising a pair of relatively rotatable chucks disposed in a spaced-apart relation on a common axis and having work-engageable die means therein; support means on said frame supporting the chucks for the relative rotation and providing for axial closing and opening relative movement between said chucks; a first actuating means connected with said chuck means and operable to cause the axial closing relative movement between the chucks for engaging the die means thereof with opposite ends of a workpiece; a rotary actuating means connected with said chuck means for causing the relative rotation between the chucks while said ends are in engagement with said die means; supply means on one side of said common axis and adapted to supply individual workpieces; receiver means on the other side of said axis for receiving finished workpieces; auxiliary workholder means adjacent said chuck means for receiving and supporting a workpiece with the ends thereof in a substantially axially aligned relation to the chucks; loading means comprising first and second picker means; means supporting said loading means for gyratory movement of said picker means in a plane extending transverse to said axis and comprising a lifting movement component, a conveying movement component and a lowering movement component; said first picker means being effective to pick a workpiece from said supply means during said lifting movement component and to deposit the workpiece on said auxiliary means during said lowering movement component; said second picker means being effective to pick a finished workpiece from said auxiliary means during said lifting movement component and to deposit the finished workpiece on said receiver means during said lowering movement component; and actuating means effective on said loading means to cause gyratory movement of the picker means.

12. In a machine for operating on rod-like workpieces; a frame; chuck means comprising a pair of relatively rotatable chucks disposed in a spaced-apart relation on a common axis and having work-engageable die means therein; support means on said frame supporting the chucks for the relative rotation and providing for axial closing and opening relative movement between said chucks; a first actuating means connected with said chuck means and operable to cause the axial closing relative movement between the chucks for engaging the die means thereof with opposite ends of a workpiece; a rotary actuating means connected with said chuck means for causing the relative rotation between the chucks while said ends are in engagement with said die means; loading means comprising arm means adapted to receive the workpiece thereon; auxiliary workholder means between said chucks for supporting the workpiece with the ends thereof in a substantially aligned relation to the chucks; and supporting and actuating means for said arm means comprising pivot means having said arm means connected therewith for lifting and lowering swinging movements of the arm means in a plane extending transverse to said axis, and an actuator device effective on said arm means for causing such lifting and lowering swinging movements thereof relative to a workpiece located on said auxiliary means.

13. In a machine for operating on rod-like workpieces; a frame; chuck means comprising a pair of relatively rotatable chucks disposed in a spaced-apart relation on a common axis and having work-engageable die means therein; support means on said frame supporting the chucks for the relative rotation and providing for axial closing and opening relative movement between said chucks; a first actuating means connected with said chuck means and operable to cause the axial closing relative movement between the chucks for engaging the die means thereof with opposite ends of a workpiece; a rotary actuating means connected with said chuck means for causing the relative rotation between the chucks while said ends are in engagement with said die means; loading means comprising arm means adapted to receive the workpiece thereon; auxiliary workholder means between said chucks for supporting the workpiece with the ends thereof in a substantially aligned relation to the chucks; pivot means supporting said arm means for swinging movement in a substantially vertical direction transversely of said axis and also providing for a conveying movement of said arm means in a substantially lateral direction transversely of said axis; and actuating means effective on said arm means comprising a first actuator device operable to cause such conveying movement of said arm means relative to said auxiliary means, and a second actuator device operable to cause such vertical swinging of said arm means relative to a workpiece located on said auxiliary means.

14. In a machine for operating on rod-like workpieces; a frame; chuck means comprising a pair of relatively rotatable chucks disposed in a spaced-apart relation on a common axis and having work-engageable die means therein; support means on said frame supporting the chucks for the relative rotation and providing for axial closing and opening relative movement between said chucks; a first actuating means connected with said chuck means and operable to cause the axial closing relative movement between the chucks for engaging the die means thereof with opposite ends of a workpiece; a rotary actuating means connected with said chuck means for causing the relative rotation between the chucks while said ends are in engagement with said die means; supply means on one side of said common axis and adapted to supply individual workpieces in succession; auxiliary workholder means adjacent said chuck means for receiving a workpiece and supporting the same with the ends thereof in a substantially axially aligned relation to the chucks; loading means comprising arm means having picker means thereon; pivot means supporting said arm means for vertical swinging and lateral transfer movements in a plane extending transverse to said axis; and actuating means effective on said arm means comprising a first actuator device operable to cause such lateral transfer movement of said picker means between said supply means and said auxiliary means, and a second actuator device operable to produce such vertical swinging movement for causing said picker means to pick a workpiece from said supply means and deposit the same on said auxiliary means.

15. In a machine for operating on rod-like workpieces; a frame; chuck means comprising a pair of relatively rotatable chucks disposed in a spaced-apart relation on a common axis and having work-engageable die means therein; support means on said frame supporting the chucks for the relative rotation and providing for axial closing and opening relative movement between said chucks; a first actuating means connected with said chuck means and operable to cause the axial closing relative movement between the chucks for engaging the die means thereof with opposite ends of a workpiece; a rotary actuating means connected with said chuck means for causing the relative rotation between the chucks while said ends are in engagement with said die means; auxiliary workholder means adacent said chucks for supporting a finished workpiece upon the occurrence of the opening relative movement between the chucks; receiver means on one side of said common axis for receiving finished workpieces; loading means comprising arm means having picker means thereon; pivot means supporting said arm means for vertical swinging and lateral transfer movements in a plane extending transverse to said axis; and actuating means effective on said arm means comprising a first actuator device operable to cause such lateral transfer movement of said picker means between said auxiliary means and said receiving means, and a second actuator device operable to produce such vertical swinging movement for causing said picker means to pick the finished workpiece from said auxiliary means and deposit the same on said receiver means.

16. In a machine for torsionally flexing a metal workpiece; a frame; chuck means comprising a pair of rotatable and nonrotatable chuck devices in a spaced-apart relation on a common axis and having work-engaging means adapted for connection with spaced portions of the workpiece; support means on said frame supporting said chuck devices and providing for axial relative closing movement therebetween for causing engagement between said portions and said work-engaging means; a first actuating means connected with said chuck means and operable to cause said axial closing movement; the rotatable chuck device comprising driving and driven chuck members having co-operating portions providing for limited relative rotation between said chuck members; the work-engaging means of said rotatable chuck device being on said driven chuck member; and rotary drive means connected with said driving chuck member.

17. In a machine of the character described, a frame; a pair of head and tail chucks disposed in a spaced-apart relation on a common axis; support means on said frame supporting the tail chuck for axial movements toward and away from the head chuck and restraining said tail chuck against rotation; other support means on said frame supporting said head chuck; said head chuck comprising a rotatable driving chuck member and a rotatable driven chuck member driven by said driving chuck member; said driving and driven chuck members having co-operating portions providing for limited relative rotation between said chuck members; said tail chuck and said driven chuck member having workholder means thereon for holding engagement with spaced portions of a workpiece to be torsionally flexed; rotary drive means connected with said driving chuck member; and indicator means comprising a stationary annular indicator means on said frame, and a co-operating movable annular indicator means surrounding said common axis and connected with said driven chuck member.

18. In a machine for torsionally flexing a metal workpiece; a frame; chuck means comprising a pair of rotatable and nonrotatable chuck devices in a spaced-apart relation on a common axis and having work-engaging means adapted for connection with spaced portions of the workpiece; support means on said frame supporting said chuck devices and providing for axial relative closing movement therebetween for causing engagement between said portions and said work-engaging means; a first actuating means connected with said chuck means and operable to cause said axial closing movement; the rotatable chuck device comprising driving and driven chuck members having co-operating portions providing for limited relative rotation between said chuck members; the work-engaging means of said rotatable chuck device being on said driven chuck member; rotary drive means connected with said driving chuck member; and electric signaling means responsive to the relative rotation between said chuck members comprising co-operating switch members carried by the respective chuck members.

19. A machine as defined in claim 18 wherein said signaling means is a switch means on said rotatable chuck device; said switch means comprising a pair of switches connected with one of said chuck members, and actuating means common to said switches and connected with the other of said chuck members.

20. In a machine for torsionally flexing a metal workpiece; a frame; chuck means comprising a pair of rotatable and nonrotatable chuck devices in a spaced-apart relation on a common axis and having work-engaging means adapted for connection with spaced portions of the workpiece; support means on said frame supporting said chuck devices and providing for axial relative closing movement therebetween for causing engagement between said portions and said work-engaging means; a first actuating means connected with said chuck means and operable to cause said axial closing movement; the rotatable chuck device comprising driving and driven chuck members having co-operating portions providing for limited relative rotation between said chuck members; the work-engaging means of said rotatable chuck device being on said driven chuck member; a reversible rotary drive means connected with said driving chuck member; electric signaling means responsive to the relative rotation between said chuck members comprising switch means on said rotatable chuck device; said switch means comprising a pair of switches connected with one of said chuck members, and actuating means common to said switches and connected with the other of said chuck members; and indicator means comprising a stationary indicator means on said frame and a co-operating movable indicator means connected with said driven chuck member.

21. In a machine for operating on rod-like workpieces;

a frame; chuck means comprising a pair of relatively rotatable chucks disposed in a spaced-apart relation on a common axis and having work-engageable die means therein; support means on said frame supporting the chucks for the relative rotation and providing for axial closing and opening relative movement between said chucks; a first actuating means connected with said chuck means and operable to cause the axial closing relative movement between the chucks for engaging the die means thereof with opposite ends of a workpiece; a rotary actuating means connected with said chuck means for causing the relative rotation between the chucks while said ends are in engagement with said die means; loading means comprising arm means extending transversely of said axis and adapted to receive the workpiece thereon; auxiliary workholder means between said chucks for supporting the workpiece with the ends thereof in a substantially aligned relation to the chucks; pivot means on said frame; crosshead means connecting said arm means with said pivot means and providing for swinging movement and endwise translatory movement of said arm means; a first driven means effective on said arm means for producing the translatory movement thereof; and other driven means effective on said arm means for causing lifting and lowering swinging movements thereof relative to a workpiece located on said auxiliary means.

22. A machine as defined in claim 21 wherein said pivot means comprises a rotatably driven shaft, and said first driven means comprises a cam connected with said shaft and effective on said arm means for producing the translatory movement thereof.

23. A machine as defined in claim 21 wherein said other driven means comprises a rotatably driven shaft, and eccentric means connected between said shaft and arm means for imparting the swinging movement to the latter.

24. A machine as defined in claim 21 wherein said pivot means comprises a rotatably driven first shaft and said first driven means comprises a cam connected with said first shaft and effective on said arm means for producing the translatory movement thereof; and wherein other driven means comprises a rotatably driven second shaft and eccentric means connected between said second shaft and said arm means for imparting the swinging movement to the latter.

25. In a machine for operating on rod-like workpieces; a frame; chuck means comprising a pair of relatively rotatable chucks disposed in a spaced-apart relation on a common axis and having work-engageable die means therein; support means on said frame supporting the chucks for the relative rotation and providing for axial closing and opening relative movement between said chucks; a first actuating means connected with said chuck means and operable to cause the axial closing relative movement between the chucks for engaging the die means thereof with opposite ends of a workpiece; a rotary actuating means connected with said chuck means for causing the relative rotation between the chucks while said ends are in engagement with said die means; supply means on one side of said common axis and adapted to supply individual workpieces in succession; auxiliary workholder means adjacent said chuck means for receiving a workpiece and supporting the same with the ends thereof in a substantially axially aligned relation to the chucks; receiver means on the other side of said axis and adapted to receive finished workpieces thereon; loading means comprising arm means extending transversely of said axis and having first and second picker means thereon; pivot means on said frame; crosshead means connecting said arm means with said pivot means and providing for swinging movements and endwise translatory movements of said arm means; said first picker means being responsive to said swinging and translatory movements for picking a workpiece from said supply means and depositing the same on said auxiliary means, and said second picker means being responsive to said swinging and translatory movements for picking a finished workpiece from said auxiliary means and depositing the same on said receiver means; a first driven means effective on said arm means for producing the translatory movements thereof; and other driven means effective on said arm means for causing the swinging movements thereof.

26. A machine as defined in claim 25 wherein said supply means comprises rack means sloping downwardly and laterally toward said auxiliary means, and said receiver means comprises rack means sloping downwardly and laterally away from said auxiliary means.

27. In a machine for torsionally flexing rod-like workpieces; a frame; a pair of head and tail chucks disposed in a spaced-apart relation on a common axis; support means on said frame supporting the tail chuck for axial closing and opening movements toward and away from the head chuck and restraining said tail chuck against rotation; other support means on said frame supporting said head chuck; said head chuck comprising a rotatable driving chuck member and a rotatable driven chuck member driven by said driving chuck member; said driving and driven chuck members having co-operating portions providing for limited relative rotation between said chuck members; said tail chuck and said driven chuck member having workholder means thereon for holding engagement with opposite ends of a workpiece to be torsionally flexed; auxiliary workholder means between said chucks for supporting the workpiece with said opposite ends substantially aligned with the workholder means of said tail chuck and driven chuck member; a double-acting first power means connected with said tail chuck for causing the axial opening and closing movements thereof; a rotatable second power means connected with said driving chuck member; supply means on one side of said common axis for supporting a plurality of the workpieces; loading means comprising arm means having picker means thereon; means supporting said arm means for vertical swinging and lateral translatory movements in a plane extending transverse to said axis for causing said picker means to transfer a workpiece from said supply means to said auxiliary means; actuating means for said loading means comprising electric motor means connected with said arm means for causing said swinging and translatory movements thereof; electrically-responsive control devices connected with said first and second power means for controlling the same; and control switch means electrically connected with said control devices and motor means for causing sequential operation of said motor means and said first and second power means.

28. A machine as defined in claim 27 for torsionally flexing rod-like workpieces wherein said control switch means comprises a sequence switch device driven by the rotary movement supplied by said second power means, and limit switch means responsive to the actuation of said tail chuck by said first power means and the actuation of said loading means by said motor means.

29. A machine as defined in claim 28 for torsionally flexing rod-like workpieces wherein said limit switch means also comprises load-indicating switch means responsive to said limited relative rotation between said chuck members.

30. A machine as defined in claim 27 for torsionally flexing rod-like workpieces and comprising receiver means on the other side of said axis; and wherein said picker means comprises first and second picker means; said first picker means being effective to transfer a workpiece from said supply means to said auxiliary means, and said second picker means being effective to transfer a finished workpiece from said auxiliary means to said receiver means.

References Cited in the file of this patent

UNITED STATES PATENTS

| 1,071,945 | Moon | Sept. 2, 1913 |
| 2,715,431 | Grossu | Aug. 16, 1955 |
| 2,800,705 | Ingalls et al. | July 30, 1957 |